US012761397B2

(12) United States Patent
Iwami et al.

(10) Patent No.: US 12,761,397 B2
(45) Date of Patent: Oct. 13, 2026

(54) OPTICAL ELEMENT AND OPTICAL DESIGN METHOD

(71) Applicant: KOWA COMPANY, Ltd., Nagoya (JP)

(72) Inventors: Kentaro Iwami, Tokyo (JP); Hideki Ina, Tokyo (JP); Jun Maruyama, Soka (JP)

(73) Assignee: KOWA COMPANY, LTD., Aichi (JP)

( * ) Notice: Subject to any disclaimer, the term of this patent is extended or adjusted under 35 U.S.C. 154(b) by 253 days.

(21) Appl. No.: 18/650,809

(22) Filed: Apr. 30, 2024

(65) Prior Publication Data

US 2024/0369737 A1 Nov. 7, 2024

(30) Foreign Application Priority Data

May 2, 2023 (JP) ................................ 2023-076147

(51) Int. Cl.
*G02B 1/00* (2006.01)
*G02B 3/00* (2006.01)
*G02B 27/00* (2006.01)

(52) U.S. Cl.
CPC ............... *G02B 1/002* (2013.01); *G02B 3/00* (2013.01); *G02B 27/0012* (2013.01)

(58) Field of Classification Search
None
See application file for complete search history.

(56) References Cited

U.S. PATENT DOCUMENTS

| | | | | |
|---|---|---|---|---|
| 12,320,991 B2 * | 6/2025 | Wang | G02B 1/002 |
| 2021/0014394 A1 * | 1/2021 | Han | G02B 5/286 |
| 2021/0103075 A1 * | 4/2021 | Park | G02B 5/126 |
| 2022/0082794 A1 * | 3/2022 | Kim | G02B 13/003 |
| 2024/0427115 A1 * | 12/2024 | Otani | G02B 5/00 |
| 2025/0123469 A1 * | 4/2025 | Hao | C03C 17/02 |

FOREIGN PATENT DOCUMENTS

JP 2020-86055 6/2020

* cited by examiner

*Primary Examiner* — Darryl J Collins
(74) *Attorney, Agent, or Firm* — WENDEROTH, LIND & PONACK, L.L.P.

(57) ABSTRACT

An optical element includes: a metalens having a finely shaped surface on which a fine pattern is formed based on a shape of a meta-atom and a bonded surface formed in a flat shape; and a bonding lens having a feature equivalent to an existing lens and being bonded to the bonded surface. For example, the bonding lens includes: a first glass material bonded to the bonded surface; and a second glass material separated from the bonded surface and bonded to the first glass material. For example, an optical design method includes: a setting step of setting, based on optical design of a configuration including binary optics replacing a feature of the metalens, a first step pattern of the binary optics; a first calculation step; and a first identification step.

8 Claims, 12 Drawing Sheets

| PARAMETER | VALUE |
|---|---|
| DIFFRACTION ORDER | 1 |
| NORMALIZED WAVELENGTH | 500.00000 |
| R**2 (C1) | -0.00500 |
| R**4 (C2) | 0.00000 |
| R**6 (C3) | 0.00000 |
| R**8 (C4) | 0.00000 |
| R**10 (C5) | 0.00000 |
| R**12 (C6) | 0.00000 |
| R**14 (C7) | 0.00000 |
| R**16 (C8) | 0.00000 |
| R**18 (C9) | 0.00000 |
| R**20 (C10) | 0.00000 |
| END OF DATA | |

OPTICAL ELEMENT AND OPTICAL DESIGN METHOD

BACKGROUND OF THE INVENTION

1. Field of the Invention

The present invention relates to an optical element and an optical design method.

2. Description of the Related Art

In recent years, "metalenses" (also called "flat optics") have been attracting attention as optical elements, for which research and development are being conducted in research institutions around the world. Such "metalenses" are expected to be able to provide flat lenses with almost no thickness. This is because a nanometer-scale pattern drawn on a silicon surface acts like a lens. Their application to time of flight (ToF), for example, is being examined. Conventional sensors for use in ToF have a plurality of lenses placed on top to collect light, resulting in having a thickness depending on the number of lenses. On the other hand, a metalens makes it possible to provide a single plate "lens", which is expected to make sensors thinner. In particular, depending on the design, it may be possible to replace an optical system made up of a plurality of lenses with just one lens.

A metalens is also an element that controls light using a diffraction effect, which may be a type of diffractive optical element (hereinafter also referred to as DOE as needed). However, its pattern formed is required to have smaller dimensions than the wavelength of light to be controlled. Therefore, it is necessary to consider "nonlinearity due to optical traps", which needs to handle the metalens as being different from typical DOEs.

A metalens, for example, has a structure having a lens function, among structures in which a fine pattern having a shape of a meta-atom is formed by one exposure and etching, which are called metasurfaces. The metalens is also featured by its flat shape. Therefore, compared to binary optics, the metalens makes it possible to provide a more compact configuration and is expected to have a variety of applications. Note that the fine pattern formed as a metalens includes, for example, the contents disclosed in Japanese Unexamined Patent Application Publication No. 2020-86055.

Note that for a metamaterial with a structure having a lens function, the number of times of exposures may be one or more, for example, two or more. Here, a structure (a so-called metasurface) formed by one exposure is referred to as a "metalens".

For a method for manufacturing metalenses, lithography techniques used in semiconductor manufacturing are effective to form patterns at the nanometer level. For example, an oxide film or a nitride film is formed on a quartz wafer, a photoresist is applied to the film, and a pattern is exposed at the nanometer level and developed. By etching the remaining portions where there is no resist, a pattern is formed at the nanometer level. As an exposure method, various types of methods can be used, such as use of electron beams, use of ultraviolet light (with an i-line or an excimer laser oscillation wavelength) as exposure light, and nanoimprinting.

A plurality of fine patterns are formed on one quartz wafer, and the resulting wafer is then cut into individual metalenses by dicing or the like.

As described above, a quartz wafer is used to manufacture metalenses, and fine patterns are formed on one surface of the quartz wafer. However, the other surface remains flat because of no fine pattern formed thereon (to allow a part of an exposure device, which has a holding mechanism called a chuck, to suck the surface). It is difficult to add an antireflection function to this flat surface, and thus it is difficult to improve the optical performance of optical elements including metalenses. As a result, when a metalens is used to measure, for example, a ToF, reflected light from the flat surface may cause flare or ghosts, which may result in problems.

An antireflection film for normal lenses can be obtained by forming a dielectric film. When a dielectric film is formed on a flat surface of a quartz wafer for metalenses in the same way as normal lenses, the dielectric film also reaches the surface on the opposite side where fine patterns have been formed, which may cause problems in the measurement results. Note that it is being examined that fine patterns are formed using a mask or the like after a dielectric film is formed, but such film formation may cause the generation of foreign matters and the like. Even if antireflection can be achieved by forming a film using a dedicated high-performance film forming device, the introduction of a new device or the like will result in increased costs. In addition, the technique disclosed in Japanese Patent Unexamined Application Publication No. 2020-86055 neither describes nor suggests the need to improve the optical characteristics described above.

The present invention has been made in view of the above-described problems, and aims to provide an optical element and an optical design method that improve the optical characteristics.

SUMMARY OF THE INVENTION

An optical element according to a first invention includes: a metalens having a finely shaped surface on which a fine pattern is formed based on a shape of a meta-atom and a bonded surface formed in a flat shape; and a bonding lens having a feature equivalent to an existing lens and bonded to the bonded surface.

In the optical element according to a second invention, which is in the first invention, the bonding lens includes at least: a first glass material bonded to the bonded surface; and a second glass material separated from the bonded surface and bonded to the first glass material.

An optical design method according to a third invention is an optical design method for designing the optical element of the first invention, the method including a first restrictive condition step of identifying conditions for a diffractive optical element and the bonding lens that satisfy Expression (1):

$$B1 \propto \lambda_0(N1-N2)/(R\times(\lambda_1-\lambda_2)), \quad (1)$$

where B1 is a phase coefficient used to model the diffractive optical element by an equivalent refraction method using optical design software, $\lambda_0$ is a normalized wavelength of the diffractive optical element, $\lambda_1$ is a first correction target wavelength to be subjected to axial chromatic aberration correction, $\lambda_2$ is a second correction target wavelength to be subjected to axial chromatic aberration correction, N1 is a first refractive index of the bonding lens for the first correction target wavelength, N2 is a second refractive index of the bonding lens for the second correction target wavelength, and R is a radius of curvature of a convex surface of the bonding lens.

An optical design method according to a fourth invention is an optical design method for designing the optical element of the first invention, the method including a second restrictive condition step of identifying conditions for a diffractive optical element and the bonding lens that satisfy Expression (2):

$$B1 \propto \lambda_0(\varphi_{pc2} - \varphi_{pc1})/(-\lambda_1(1 - e'\varphi_{pc1}) + \lambda_2(1 - e'\varphi_{pc2})), \quad (2)$$

where B1 is a phase coefficient used to model the diffractive optical element by an equivalent refraction method using optical design software, $\lambda_0$ is a normalized wavelength of the diffractive optical element, $\lambda_1$ is a first correction target wavelength to be subjected to axial chromatic aberration correction, $\lambda_2$ is a second correction target wavelength to be subjected to axial chromatic aberration correction, $\varphi_{pc1}$ is a reciprocal of focal length (power) of the bonding lens, $\varphi_{pc2}$ is a reciprocal of focal length (power) of the diffractive optical element, and e' is a geometric optical distance between the diffractive optical element and the bonding lens.

The optical design method according to a fifth invention, which is in the third invention or the fourth invention, includes: a setting step of setting, based on optical design of a configuration including binary optics included in one diffractive optical element replacing a feature of the metalens, a first step pattern of the binary optics; a first calculation step of calculating first phase data indicating a phase relationship with respect to the shape of the meta-atom based on a preset first wavelength; and a first identification step of calculating a first phase pattern from the first step pattern and identifying the fine pattern corresponding to the first phase pattern with reference to the first phase data.

In the optical design method according to a sixth invention, which is in the fifth invention, the setting step includes setting the first step pattern based on optical design of a configuration in which the binary optics and a conventional lens for initial setting are combined.

The optical design method according to a seventh invention, which is in the sixth invention, further includes: a second calculation step of calculating second phase data different from the first phase data based on a preset second wavelength different from the first wavelength; a second identification step of identifying a second phase pattern corresponding to the fine pattern with reference to the second phase data; and a design step of designing the bonding lens based on the first phase pattern and the second phase pattern.

In the optical design method according to an eighth invention, which is in the seventh invention, the design step includes identifying a second step pattern corresponding to the second phase pattern, and designing the bonding lens based on the second step pattern.

In the optical design method according to a ninth invention, which is in the fifth invention, the first calculation step includes calculating the first phase data using a vector model optical simulation.

According to the first invention to the ninth invention, the metalens has the bonded surface formed in a flat shape. Further, the bonding lens is bonded to the bonded surface. Therefore, the reflectance on the bonded surface of the metalens can be reduced, and for example, problems such as flare and ghosts caused by the bonded surface can be reduced. This makes it possible to improve the optical characteristics.

According to the first invention to the ninth invention, any axial chromatic aberration can be corrected by combining the feature of the metalens and the feature of the bonding lens. This makes it possible to expand the uses of the optical element.

In particular, according to the second invention, the bonding lens includes at least the first glass material and the second glass material. Therefore, by changing the material of each glass material, the characteristics of the entire optical element can be easily changed. This makes it possible to further expand the uses of the optical element.

In particular, according to the third invention, in the first restrictive condition step, the conditions for the diffractive optical element and the bonding lens that satisfy Expression (1) are identified. Therefore, it is possible to facilitate design based on axial chromatic aberration correction for two specific wavelengths. This makes it possible to facilitate optical design of a configuration including the metalens.

In particular, according to the fourth invention, in the second restrictive condition step, the conditions for the diffractive optical element and the bonding lens that satisfy Expression (2) are identified. Therefore, it is possible to facilitate design that takes into consideration the thickness of the lens. This makes it possible to improve the accuracy of the optical design of the configuration including the metalens.

In particular, according to the fifth invention, in the setting step, the first step pattern of the binary optics is set. Further, in the first identification step, the first phase pattern is calculated from the first step pattern, and the fine pattern corresponding to the first phase pattern is identified with reference to the first phase data. Therefore, by using the first step pattern that can be set by a conventional method, the fine pattern necessary for designing the metalens can be identified. This makes it possible to facilitate the optical design of the configuration including the metalens.

According to the sixth invention, the setting step includes setting the first step pattern based on the optical design of the configuration in which the binary optics and the conventional lens for initial setting are combined. Therefore, by using the first step pattern based on the combination of the binary optics and the conventional lens, the fine pattern necessary for designing the metalens can be identified. This makes it possible to facilitate optical design of a configuration in which the metalens and the bonding lens are combined.

DESCRIPTION OF EMBODIMENTS

Hereinafter, examples of an optical element and an optical design method as embodiments of the present invention will be described with reference to the drawings. Note that the configurations in figures are schematically depicted for the purpose of explanation, and the shape, the thickness, and the like of each configuration may differ from those illustrated in the figures.

Embodiment: Optical Element 100

Figure 1A:
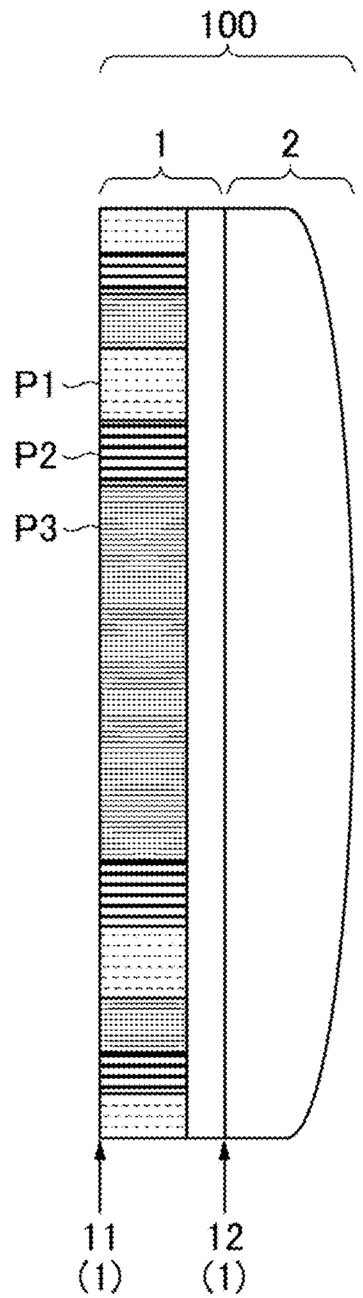
FIG. 1A is a schematic diagram illustrating an example of an optical element according to an embodiment.
Figure 1B:
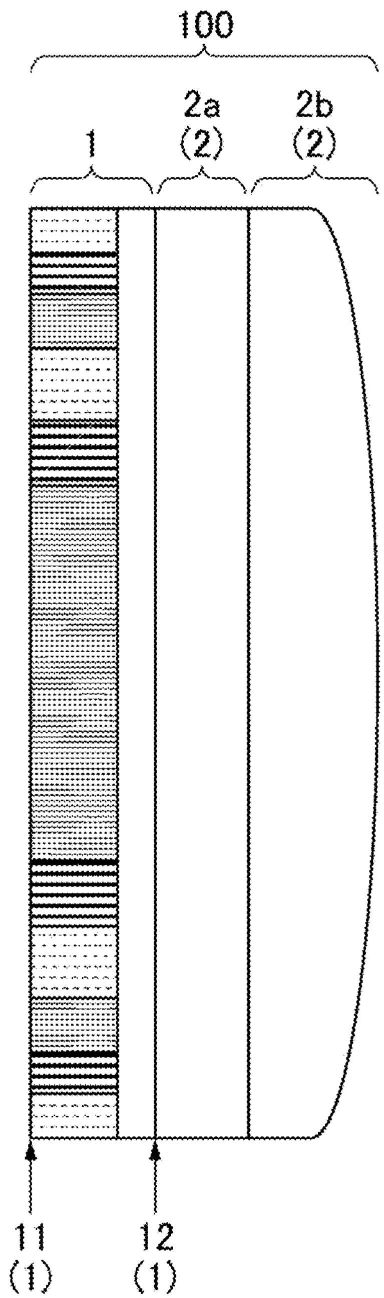
FIG. 1B is a schematic diagram illustrating a modification of a bonding lens.

An example of an optical element 100 according to an embodiment will be described below. FIG. 1A is a schematic diagram illustrating an example of the optical element 100 according to the embodiment, and FIG. 1B is a schematic diagram illustrating a modification of a bonding lens 2.

The optical element 100 according to the embodiment includes, for example, a metalens 1 and the bonding lens 2, as illustrated in FIG. 1A. The metalens 1 exhibits a light condensing function (a so-called lens function) that requires different handling from conventional diffractive optical elements. The bonding lens 2 has different features from the metalens 1 and refers to a general lens (an existing lens or a conventional lens) such as a refractive lens, a diverging lens, and a reflective lens.

The metalens 1 has a finely shaped surface 11 and a bonded surface 12. The finely shaped surface 11 indicates a surface on which a fine pattern is formed. The fine pattern is structured based on the shape of a meta-atom, and the characteristics of the metalens 1 change depending on the structure of the fine pattern. For example, a plurality of different fine patterns may be formed on the finely shaped surface 11. Note that the features and types of the fine patterns formed on the finely shaped surface 11 can be set as appropriate depending on the uses.

For example, as illustrated in FIG. 1A, a first pattern P1, a second pattern P2, and a third pattern P3 are examples of different types of fine patterns. The first pattern P1, the second pattern P2, and the third pattern P3 have a structure in which an area occupied by an element material such as glass is smaller in this order (P1<P2<P3). In this case, the effective refractive index, which features the metalens 1, tends to be lower in the order of the first pattern P1, the second pattern P2, and the third pattern P3 (P1<P2<P3). Note that when referring to a cross-sectional view of the metalens 1, the patterns P1, P2, and P3 are compared with each other based on the areas, but in reality, the comparison can be made based on the volume (the shape of the meta-atom) of each of the patterns P1, P2, and P3.

As the material for the metalens 1, a known material such as quartz ($SiO_2$) and S-BSL7 is used. Note that the selection of the material for the metalens 1 needs to consider the trade-off between the necessary specifications for unnecessary light and the necessary specifications for an aberration.

The bonded surface 12 is a surface that faces the finely shaped surface 11 and is formed in a flat shape. No fine pattern is formed on the bonded surface 12.

The bonding lens 2 has the same features as existing lenses, and is bonded to the bonded surface 12. The bonding lens 2 is bonded to the bonded surface 12 via, for example, a known lens adhesive. The surface of the bonding lens 2 to be bonded to the bonded surface 12 is formed, for example, in a flat shape.

The optical element 100 described above can reduce the reflectance on the bonded surface 12 of the metalens 1, and can reduce, for example, problems such as flare and ghosts caused by the bonded surface 12. This makes it possible to improve the optical characteristics.

In addition, according to the optical element 100 described above, any axial chromatic aberration can be corrected by combining the features of the metalens 1 and the features of the bonding lens 2. This makes it possible to expand the uses of the optical element 100.

The bonding lens 2 includes at least a first glass material 2*a* and a second glass material 2*b*, as illustrated in FIG. 1B, for example. The first glass material 2*a* is bonded to the bonded surface 12. The second glass material 2*b* is separated from the bonded surface 12 and is bonded to the first glass material 2*a*. Therefore, by changing the material of each of the glass materials 2*a* and 2*b*, the characteristics of the entire optical element 100 can be easily changed. This makes it possible to further expand the uses of the optical element 100. Note that the bonding lens 2 may include, for example, any glass material depending on the uses, in addition to the first glass material 2*a* and the second glass material 2*b*.

Embodiment: Optical Design Method

Figure 2A:
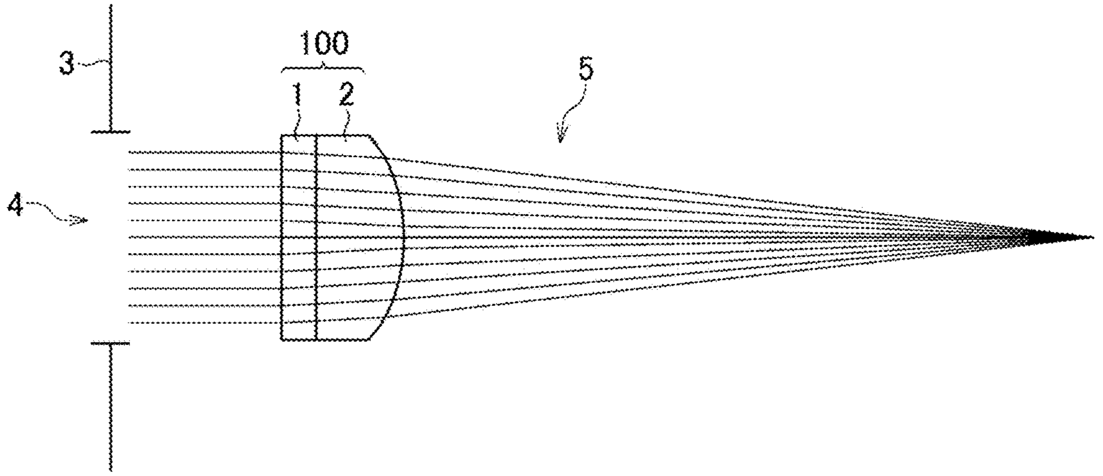
FIG. 2A is a schematic diagram illustrating an example of a configuration in which a metalens and a bonding lens are combined.
Figure 2B:
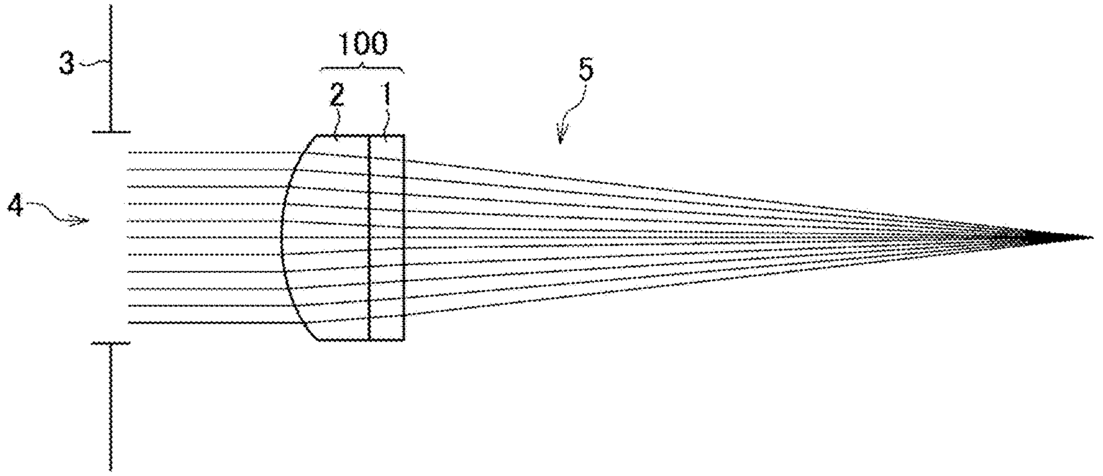
FIG. 2B is a schematic diagram illustrating a modification of a configuration in which a metalens and a bonding lens are combined.
Figure 3:
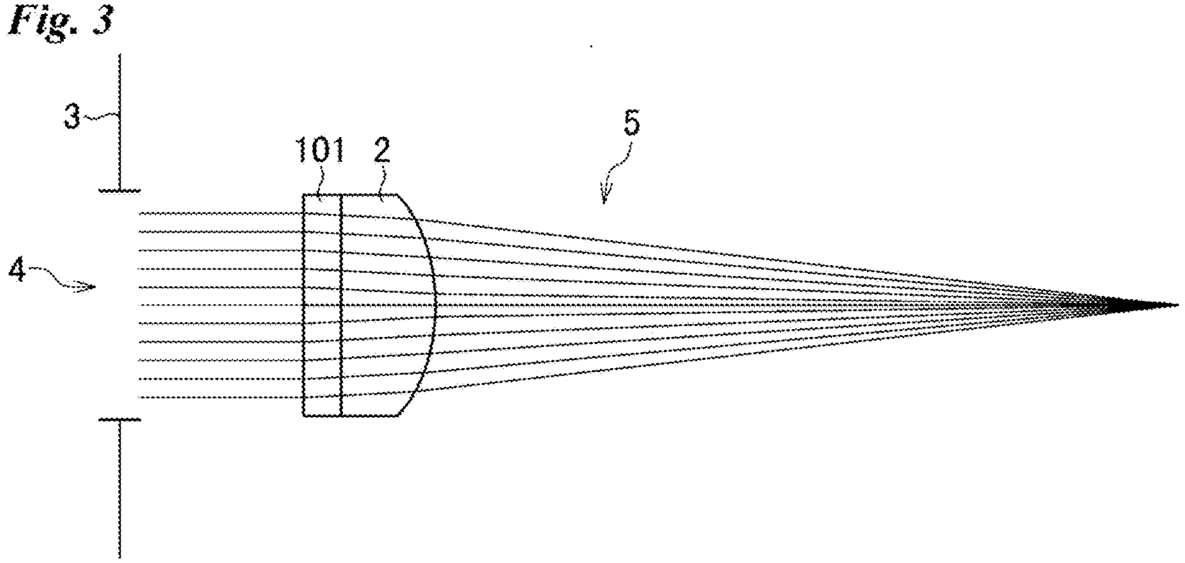
FIG. 3 is a schematic diagram illustrating an example of a configuration in which a diffractive optical element and a bonding lens are combined.
Figure 4A:
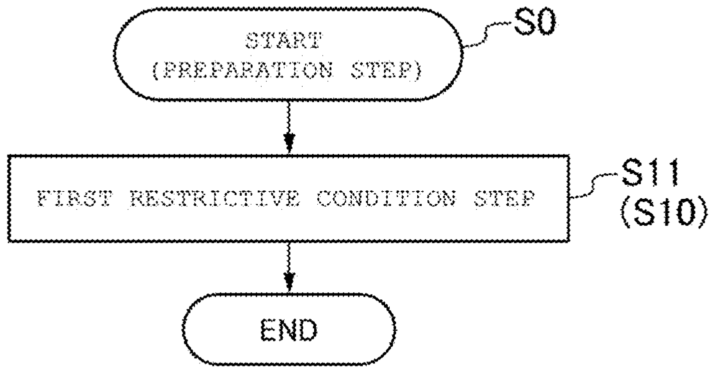
FIG. 4A is a flowchart illustrating an example of an optical design method according to an embodiment.
Figure 4B:
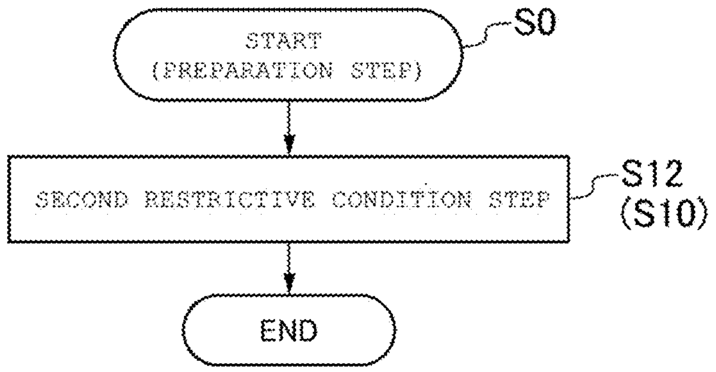
FIG. 4B is a flowchart illustrating a modification of a restrictive condition step.

An example of an optical design method according to an embodiment will be described below. FIG. 2A is a schematic diagram illustrating an example of a configuration in which a metalens 1 and a bonding lens 2 are combined, and FIG. 2B is a schematic diagram illustrating a modification of a configuration in which a metalens 1 and a bonding lens 2 are combined. FIG. 3 is a schematic diagram illustrating an example of a configuration in which a diffractive optical element 101 and a bonding lens 2 are combined. FIG. 4A is a flowchart illustrating an example of the optical design method according to the embodiment, and FIG. 4B is a flowchart illustrating a modification of a restrictive condition step S10.

The optical design method according to the embodiment can be used for optical design of an optical element 100 including, for example, the metalens 1 and the bonding lens 2, as illustrated in FIG. 2A. In the optical design method, for example, with a configuration in which a diaphragm 3 and the optical element 100 are arranged in this order, it is possible to obtain information regarding condensed light 5 when parallel light 4 from an object at infinity is incident. Note that, in the arrangement of the optical element 100, in addition to arranging the metalens 1 between the diaphragm 3 and the bonding lens 2, the bonding lens 2 may be arranged between the diaphragm 3 and the metalens 1, for example, as illustrated in FIG. 2B, and they can be arranged as appropriate depending on the uses.

The optical design method includes the restrictive condition step S10. In the restrictive condition step S10, conditions for a configuration in which the diffractive optical element 101, which replaces the features of the metalens 1, and the bonding lens 2 are combined are identified using known optical design software, for example, as illustrated in FIG. 3. For example, the restrictive condition step S10 takes into consideration the use of a plano-convex lens as the bonding lens 2, which makes it possible to perform design with higher accuracy as compared with taking into consideration other lenses. In this case, the restrictive condition step S10 is performed on the premise that the flat surface side of the bonding lens 2 is bonded to the flat surface of the diffractive optical element 101, which replaces the bonded surface 12.

The optical design method can be any method using, for example, the conditions identified in the restrictive condition step S10 to perform the optical design of the optical element 100.

The restrictive condition step S10 may include, for example, a first restrictive condition step S11 illustrated in FIG. 4A, as well as may include, for example, a second restrictive condition step S12 illustrated in FIG. 4B. For example, when the restrictive condition step S10 includes the first restrictive condition step S11 and the second restrictive condition step S12, it can be expected that optimization of the conditions is accelerated. The first restrictive condition step S11 and the second restrictive condition step S12 can be performed using, for example, known optical design software such as "CODE V (registered trademark)". Note that, for example, the optical design method may include a preparation step S0 for determining specifications to be designed.

<First Restrictive Condition Step S11>

The first restrictive condition step S11 identifies conditions for the diffractive optical element 101 and the bonding lens 2 that satisfy the following Expression (1):

$$B1 \propto \lambda_0(N1 - N2)/(R \times (\lambda_1 - \lambda_2)). \tag{1}$$

The symbols in Expression (1) are defined as follows:

- B1 is a phase coefficient used to model the diffractive optical element 101 by an equivalent refraction method using optical design software,
- $\lambda_0$ is a normalized wavelength of the diffractive optical element 101,
- $\lambda_1$ is a first correction target wavelength to be subjected to axial chromatic aberration correction,
- $\lambda_2$ is a second correction target wavelength to be subjected to axial chromatic aberration correction,
- N1 is a first refractive index of the bonding lens 2 for the first correction target wavelength,
- N2 is a second refractive index of the bonding lens 2 for the second correction target wavelength, and
- R is a radius of curvature of a convex surface of the bonding lens 2.

The inventor(s) have found that this relation can be expressed by the equal sign used in the following Equation (101) instead of the proportionality sign used in the above Expression (1) by using, for example, "CODE V (registered trademark)":

$$C1 = -\lambda_0(N1 - N2)/(2R \times (\lambda_1 - \lambda_2)). \tag{101}$$

The symbol in Equation (101) is defined as follows:

C1 is a phase coefficient used to model the diffractive optical element 101 by an equivalent refraction method using "CODE V (registered trademark)".

When the above Expression (1) is satisfied, it is possible to facilitate design based on axial chromatic aberration correction for two specific wavelengths. This makes it possible to facilitate optical design of a configuration including the metalens 1 eventually. Note that the derivation of the above Expression (1) will be described later.

For example, the phase coefficient C1 used in the above Equation (101) indicates a coefficient multiplied by the square of the radius in a polynomial in which the amount of deformation of the phase of the optical wavefront when light passes through only the diffractive optical element 101 is expressed to model the diffractive optical element 101 by an equivalent refractive-index method using "CODE V (registered trademark)".

<Second Restrictive Condition Step S12>

The second restrictive condition step S12 identifies conditions for the diffractive optical element 101 and the bonding lens 2 that satisfy the following Expression (2):

$$B1 \propto \lambda_0(\varphi_{pc2} - \varphi_{pc1})/(-\lambda_1(1 - e'\varphi_{pc1}) + \lambda_2(1 - e'\varphi_{pc2})). \tag{2}$$

The symbols in Expression (2) are defined as follows:

- B1 is a phase coefficient used to model the diffractive optical element 101 by an equivalent refraction method using optical design software,
- $\lambda_0$ is a normalized wavelength of the diffractive optical element 101,
- $\lambda_1$ is a first correction target wavelength to be subjected to axial chromatic aberration correction,
- $\lambda_2$ is a second correction target wavelength to be subjected to axial chromatic aberration correction,
- $\varphi_{pc1}$ is a reciprocal of focal length (power) of the bonding lens 2,
- $\varphi_{pc2}$ is a reciprocal of focal length (power) of the diffractive optical element 101, and
- e' is a geometric optical distance between the diffractive optical element 101 and the bonding lens 2.

The inventor(s) have found that this relation can be expressed by the equal sign used in the following Equation (102) instead of the proportionality sign used in the above Expression (2) by using, for example, "CODE V (registered trademark)":

$$C1 = \lambda_0(\varphi_{pc2} - \varphi_{pc1})/(-2\lambda_1(1 - e'\varphi_{pc1}) + 2\lambda_2(1 - e'\varphi_{pc2})). \quad (102)$$

When the above Expression (2) is satisfied, it is possible to facilitate design that takes into account the thicknesses of the diffractive optical element 101, which serves as the metalens 1 eventually, and the bonding lens 2. This makes it possible to improve the accuracy of optical design of a configuration including the diffractive optical element 101.

When at least one of the first restrictive condition step S11 and the second restrictive condition step S12 described above is performed, the optical design method according to the embodiment is terminated accordingly. For example, based on the conditions identified in each of steps S11 and S12, a known manufacturing method is performed to manufacture the optical element 100 described above.

According to the embodiment, the metalens 1 has the bonded surface 12 formed in a flat shape. Further, the bonding lens 2 is bonded to the bonded surface 12. Therefore, the reflectance on the bonded surface 12 of the metalens 1 can be reduced, and for example, problems such as flare and ghosts caused by the bonded surface 12 can be reduced. This makes it possible to improve the optical characteristics.

Here, the features of the metalens 1 include condensing light by a diffraction effect, and the focal length of the metalens 1 depends on the wavelength of light passing through the metalens 1. Therefore, it is necessary to consider axial chromatic aberration to use the metalens 1.

For example, when the metalens 1 is used for TOF, the characteristics of the metalens 1 need to be suited for a wavelength of about 850 nm or 940 nm. However, since such a wavelength range cannot be directly seen by the human eye, it is necessary to take measures such as adjusting an optical axis.

In contrast, according to the embodiment, any axial chromatic aberration can be corrected by combining the features of the metalens 1 and the features of the bonding lens 2. This makes it possible to expand the uses of the optical element 100.

Further, according to the embodiment, the bonding lens 2 includes at least the first glass material **2*a* and the second glass material 2*b*. Therefore, by changing the material of each of the glass materials 2*a* and 2*b*, the characteristics of the entire optical element 100 can be easily changed. This makes it possible to further expand the uses of the optical element 100**.

Further, according to the embodiment, the first restrictive condition step S11 identifies conditions for the diffractive optical element 101 and the bonding lens 2 that satisfy Expression (1). Therefore, it is possible to facilitate design based on axial chromatic aberration correction for two specific wavelengths. This makes it possible to facilitate optical design of a configuration including the metalens 1.

Further, according to the embodiment, the second restrictive condition step S12 identifies conditions for the diffractive optical element 101 and the bonding lens 2 that satisfy Expression (2). Therefore, it is possible to facilitate design that takes into consideration the thickness of the lens. This makes it possible to improve the accuracy of the optical design of the configuration including the metalens 1.

(First Modification: Optical Design Method)

Next, a first modification of an optical design method according to an embodiment will be described. The difference between the embodiment described above and the first modification is that a setting step S2 and others are performed. Note that descriptions of the same contents as in the embodiment described above will not be repeated.

Figure 5:
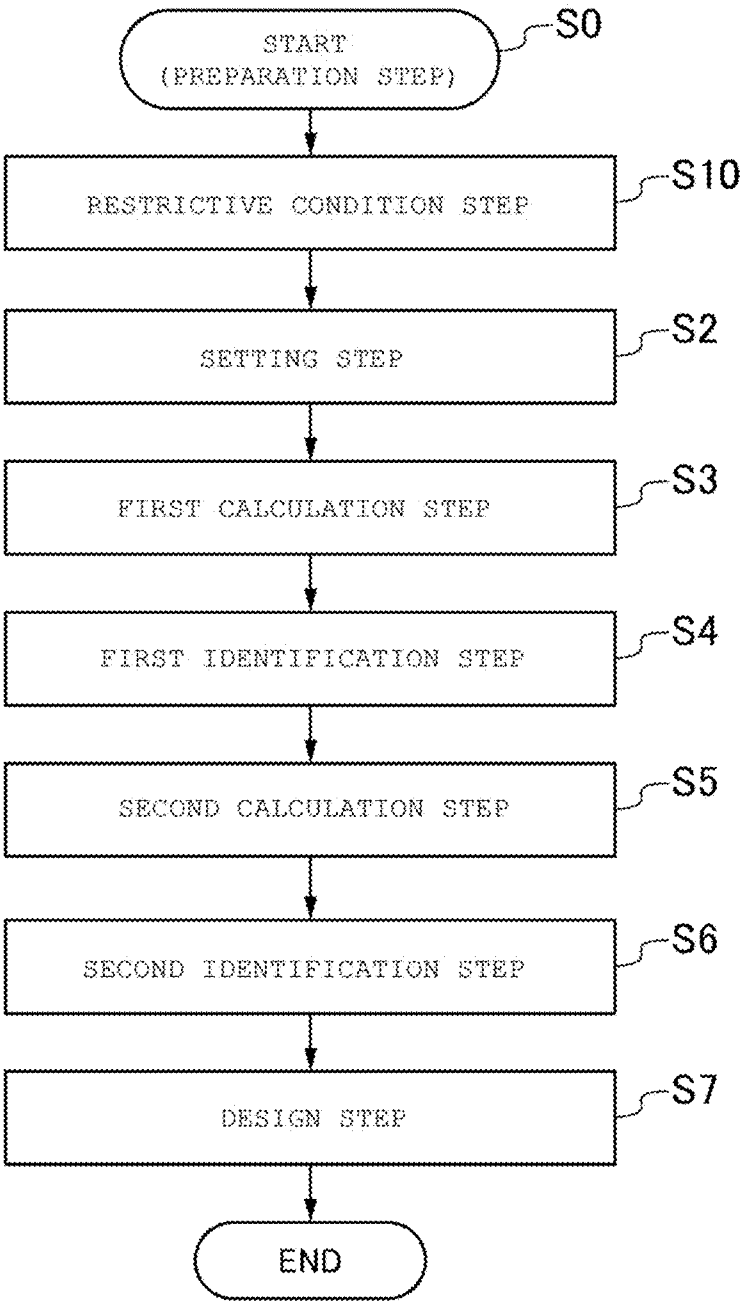
FIG. 5 is a flowchart illustrating a first modification of an optical design method according to an embodiment.

For example, as illustrated in FIG. 5, the optical design method further includes the setting step S2, a first calculation step S3, a first identification step S4, a second calculation step S5, a second identification step S6, and a design step S7. Note that when the present modification is implemented, for example, the "diffractive optical element 101" in the restrictive condition step S10 described above may be replaced with "binary optics 21" included in one diffractive optical element 101.

<Setting Step S2>

Figure 6:
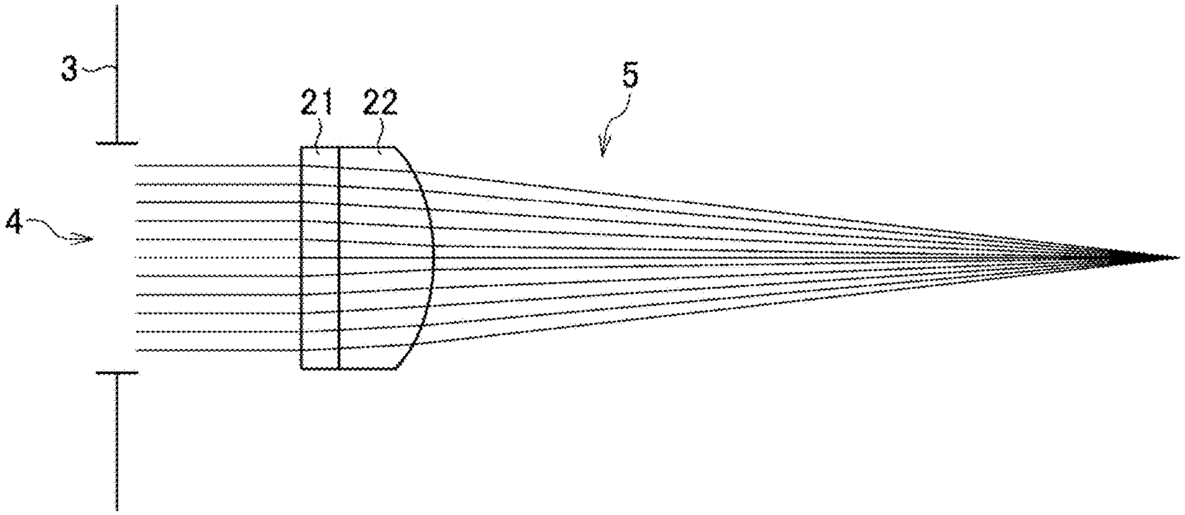
FIG. 6 is a schematic diagram illustrating an example of a configuration in which binary optics and a conventional lens are combined for optical design.

In the setting step S2, for example, as illustrated in FIG. 6, optical characteristics are determined based on optical design of a configuration in which the binary optics 21 (hereinafter also referred to as BO as needed) that replaces the features of the metalens 1 and a conventional lens 22 for initial setting are combined. The optical characteristics include, for example, a step pattern (e.g., a first step pattern) of the binary optics 21, and can be calculated using known optical design software for ray tracing. The optical characteristics may include parameters such as the wavelength, the focal length, the F-number, and various allowable aberration amounts, and may include, for example, the features of a transmitted wavefront or a reflected wavefront.

<First Calculation Step S3>

In the first calculation step S3, first phase data indicating a phase relationship with respect to the shape of a meta-atom is calculated based on a preset first wavelength λ1 (e.g., a first correction target wavelength). The first phase data indicates the above relationship based on the influence of a nonlinear component, for example. In the first calculation step S3, phase data such as the first phase data can be calculated using, for example, known vector model optical simulation. Note that the phase data is calculated using parameters such as the material of the metalens 1 to be designed, the refractive index, the shape of the meta-atom (e.g., a cylinder), the height of the meta-atom, and the corresponding wavelength.

<First Identification Step S4>

In the first identification step S4, a first phase pattern is calculated from the first step pattern, and a fine pattern indicating the shape of a meta-atom corresponding to the first phase pattern is identified with reference to the first phase data. An example of a method for identifying the fine pattern will be described later.

<Second Calculation Step S5>

In the second calculation step S5, second phase data different from the first phase data is calculated based on a second wavelength λ2 (e.g., a second correction target wavelength) different from the preset first wavelength l. The second phase data can be calculated, for example, using known vector model optical software in the same manner as the first phase data described above.

Note that, in the second calculation step S5, for example, a plurality of pieces of phase data in addition to the second phase data may be calculated. In this case, in the second calculation step S5, the plurality of pieces of phase data are calculated based on different wavelengths.

<Second Identification Step S6>

In the second identification step S6, a second phase pattern corresponding to the fine pattern identified in the first identification step S4 is identified with reference to the second phase data. An example of a method for identifying the second phase pattern will be described later.

Note that, in the second identification step S6, for example, a plurality of phase patterns in addition to the second phase pattern may be identified with reference to the plurality of pieces of phase data calculated in the second calculation step S5. Any number of phase patterns may be identified.

<Design Step S7>

In the design step S7, the bonding lens 2 is designed, for example, based on the first phase pattern and the second phase pattern. In the design step S7, optical design for the bonding lens 2 can be performed using, for example, known optical design software for ray tracing. Note that the designed bonding lens 2 may have the same features as, for example, the conventional lens 22 for initial setting in the setting step S2, or may have different features. Note that it is optional whether or not to perform the design step S7.

In the design step S7, the bonding lens 2 may be designed, for example, based on the phase data (e.g., the second phase data) calculated in the second calculation step S5. In the design step S7, the bonding lens 2 may be designed, for example, based on the first phase pattern or the first step pattern in addition to the second phase pattern. Also in these cases, in the design step S7, the optical design for the bonding lens 2 can be performed using, for example, known optical design software for ray tracing.

The first phase pattern and the second phase pattern are each associated with the same fine pattern of the metalens 1. Therefore, by using the first phase pattern and the second phase pattern, the features of the metalens 1 can be easily exhibited, and the bonding lens 2 to be combined with the metalens 1 can be easily designed accordingly.

Note that, in the design step S7, the bonding lens 2 may be designed based on the plurality of phase patterns identified in the second identification step S6, in addition to the second phase pattern, for example.

Hereinafter, the modification of the optical design method will be described in detail. Now, correction for two or more wavelengths is considered. Hereinafter, among the binary optics 21, the binary optics 21 having the first phase pattern in the setting step S2 will be referred to as BO-A, the binary optics 21 having the second phase pattern in the second identification step S6 will be referred to as BO-B, and n binary optics 21 having any one of the plurality of phase patterns in the second identification step S6 will be referred to as BO-n (n is an integer of 1 or more) to make the description. Note that BO-n may exhibit the same features as BO-A or BO-B.

In the setting step S2, optical characteristics are determined based on optical design of a configuration in which BO-A and the conventional lens 22 for initial setting are combined. The optical characteristics include, for example, the first step pattern of BO-A. In the setting step S2, conditions for the above configuration are set, for example, based on the specifications determined in the preparation step S0.

In the setting step S2, optical characteristics are determined using an equivalent refractive-index method, for example, based on the optical design of the configuration in which BO-A and the conventional lens 22 are combined. In the setting step S2, optical design is performed to achieve optical characteristics that satisfy required specifications, for example, for on-axis and off-axis angles of view and a plurality of wavelengths. Note that any type and number of conventional lenses 22 for initial setting may be used.

In the first calculation step S3, the first phase data is calculated based on the preset first wavelength l. In the first calculation step S3, the phase data is calculated using known vector model optical software. Therefore, the calculated phase data indicates data that also takes into consideration the influence of nonlinearity due to the above-mentioned "optical traps". This makes it possible to design the fine pattern of the metalens 1 for the first step pattern of BO-A.

Figure 7:
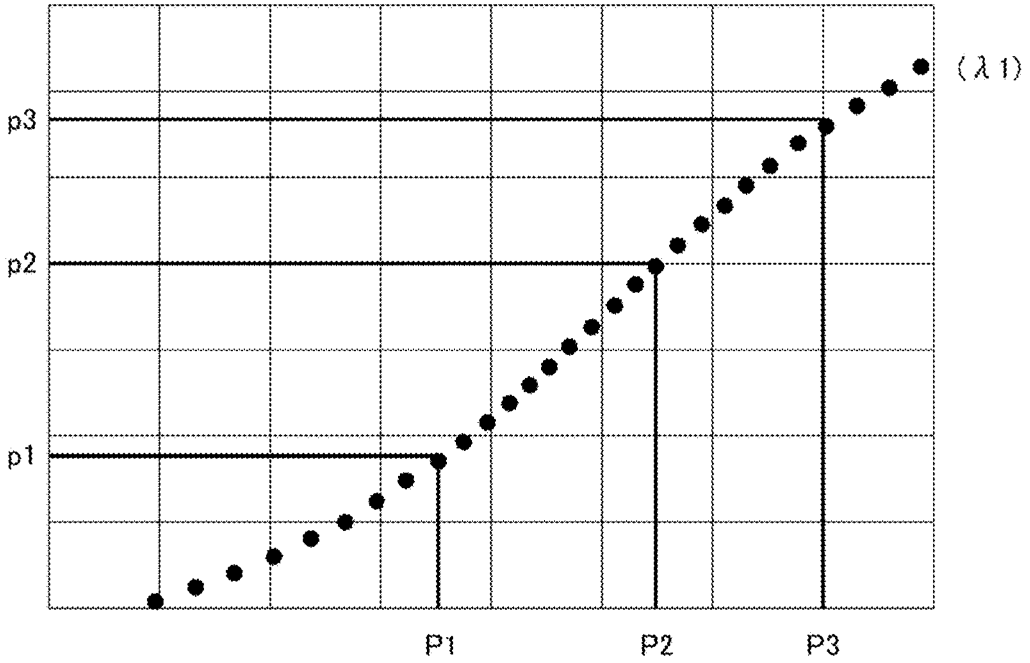
FIG. 7 is a graph illustrating an example of phase data.

As illustrated in FIG. 7, for example, the first phase data shows the shape of the meta-atom (e.g., cylinder diameters P1, P2, P3, etc.) on the horizontal axis and the phase (e.g., p1, p2, p3, etc.) on the vertical axis. The first phase data indicates a feature in which the phase changes nonlinearly with respect to changes in the shape of the meta-atom. This makes it possible to design the fine pattern of the metalens 1 having complicated characteristics with high accuracy. Note that the phase pattern has a different relationship between the phase and the shape of the meta-atom depending on the wavelength. Therefore, when phase data is calculated based on a wavelength different from the first wavelength λ1, phase data different from the first phase data is obtained.

In the first identification step S4, the first phase pattern is calculated from the first step pattern of BO-A, and the fine pattern corresponding to the first phase pattern is identified with reference to the first phase data.

Figure 8:
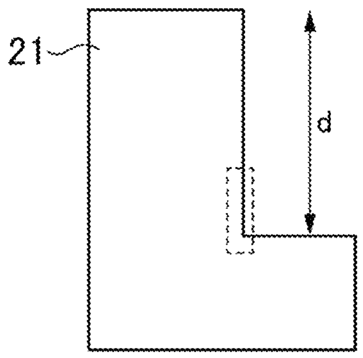
FIG. 8 is a schematic diagram illustrating an example of a step in binary optics.

The relationship between a step rise d included in the step pattern of the binary optics 21 (here, BO-A) and the phase will now be described. For example, as illustrated in FIG. 8, in a case where the step rise d of the binary optics 21 is set to have a relationship represented by the following Equation (3), when plane wave light that is perpendicularly incident to the binary optics 21 passes through, a phase difference of αλ is generated due to the influence of the step rise d:

$$Nd - d = \alpha\lambda \tag{3}$$

The symbols in Equation (3) are defined as follows:

λ is a wavelength of light,

N is a refractive index of the material of the binary optics 21 (e.g., a relative refractive index to air), and α is any coefficient (varying depending on the specifications).

According to the above Equation (3), the rise of each step in the binary optics 21 can result in a phase difference suitable for the specifications by setting the coefficient α to a different value. For example, when α is set to 1, a step rise d that satisfies a phase difference of 2π can be derived. In the first identification step S4, the first phase pattern can be calculated from the first step pattern by using the above Equation (3), for example.

Figure 9:
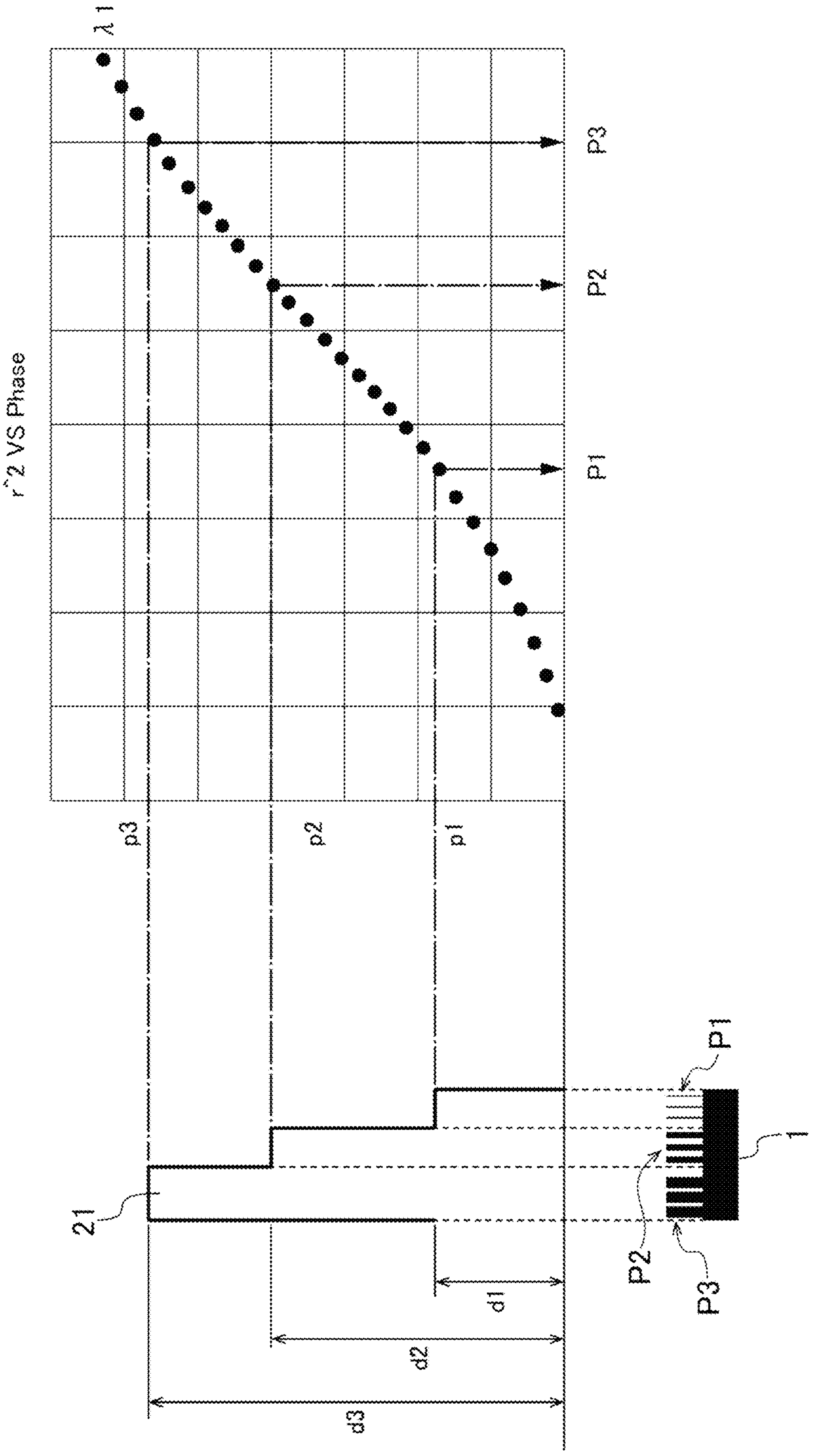
FIG. 9 is a schematic diagram illustrating an example of a process of identifying a fine pattern corresponding to a step pattern.

For example, as illustrated in FIG. 9, in the first identification step S4, phase patterns (p1, p2, and p3 in FIG. 9) are calculated from step patterns (d1, d2, and d3 in FIG. 9) by using the above Equation (3). After that, in the first identification step S4, fine patterns (P1, P2, and P3 in FIG. 9) corresponding to the calculated phase patterns (p1, p2, and p3) are identified with reference to the first phase data. In this way, in the first identification step S4, the fine patterns are identified with reference to the first phase data, so that it is possible to facilitate design of the metalens 1 that takes into consideration the influence of nonlinearity due to the "optical traps".

In the second calculation step S5, based on one or more preset wavelengths (e.g., a second wavelength λ2 and a third wavelength $\lambda 3$), one or more pieces of phase data (e.g., second phase data and third phase data) corresponding to the respective wavelengths are calculated. Note that the phase data can be calculated using a known vector model optical simulation in the same way as the first phase data described above.

In the second identification step S6, one or more phase patterns that are different for the respective pieces of phase data are identified with reference to the one or more pieces of phase data calculated in the second calculation step S5.

Figure 10:
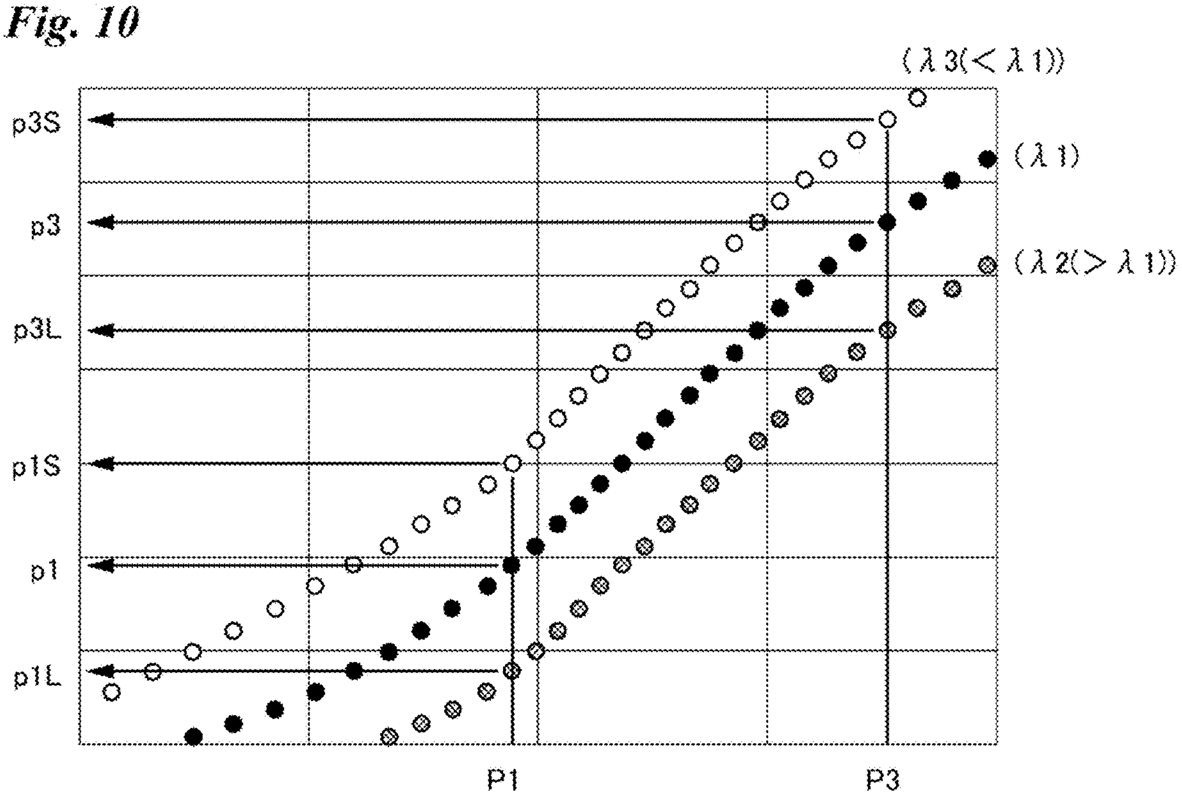
FIG. 10 is a schematic diagram illustrating an example of a difference between pieces of phase data different in wavelength.

In the second identification step S6, the phase patterns are identified using the features of the phase data. For example, as illustrated in FIG. 10, when the second wavelength $\lambda 2$ is longer than the first wavelength $\lambda 1$, the second phase data indicates a feature that is shifted to the right as a whole with respect to the first phase data. When the third wavelength $\lambda 3$ is shorter than the first wavelength $\lambda 1$, the third phase data indicates a feature that is shifted to the left as a whole with respect to the first phase data.

Based on the features described above, a phase pattern for each piece of phase data corresponding to the fine pattern (P1, P3 in FIG. 10) calculated in the first identification step S4 is identified. Specifically, when the second phase data is referred to, a phase pattern (the second phase pattern) including a phase p1L corresponding to the diameter P1 and a phase p3L corresponding to the diameter P3 is identified. When the third phase data is referred to, a phase pattern (a third phase pattern) including a phase p1S corresponding to the diameter P1 and a phase p3S corresponding to the diameter P3 is identified.

In the design step S7, the bonding lens 2 is designed based on a plurality of phase patterns including, for example, the second phase pattern. In the design step S7, when known optical design software is used, the bonding lens 2 can be designed using, for example, a different number of lenses from the conventional lens 22 for initial setting, and material characteristics such as a different glass material, as parameters.

Figure 11A:
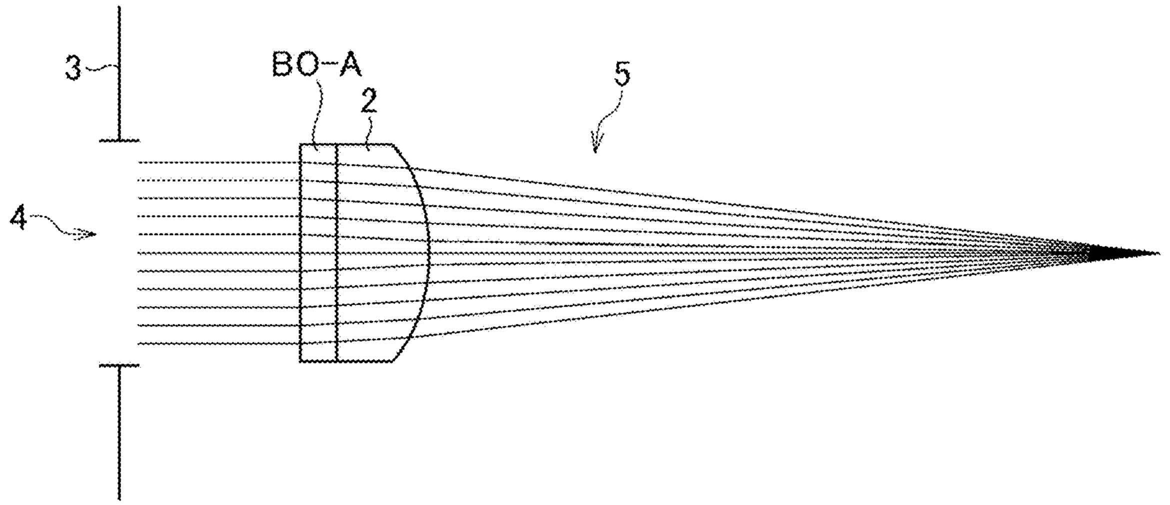
FIGS. 11A to 11C are schematic diagrams illustrating examples of a configuration in which binary optics having a different step pattern and a bonding lens are combined for optical design.
Figure 11B:
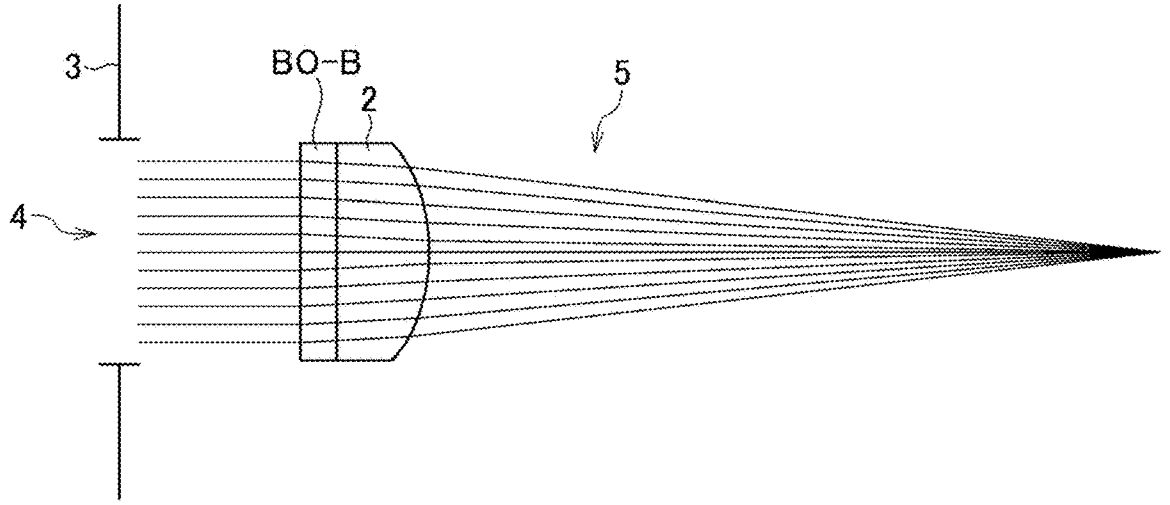
Figure 11C:
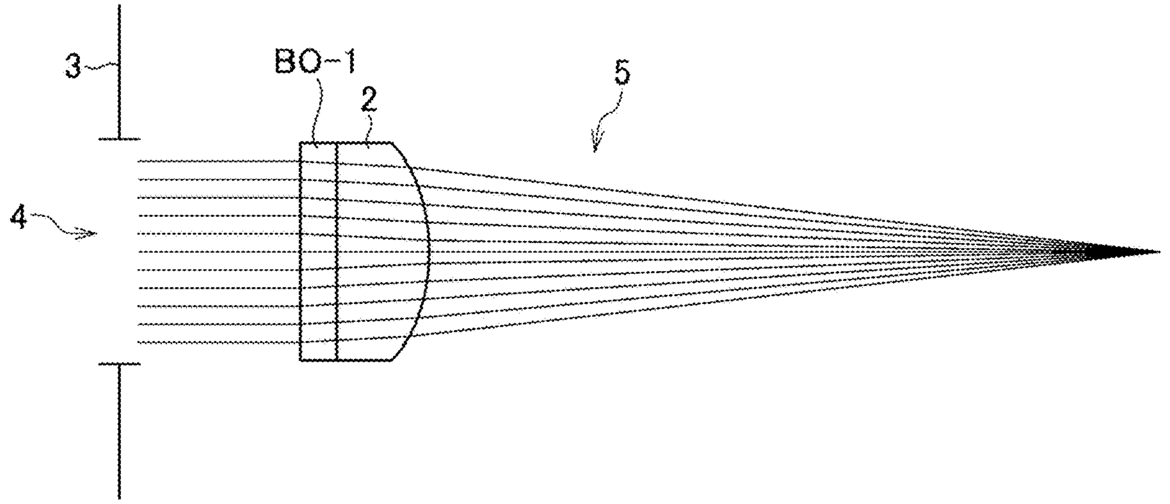

For example, for three wavelengths (the first wavelength $\lambda 1$, the second wavelength $\lambda 2$, and the third wavelength $\lambda 3$) as a plurality of wavelengths, as illustrated in FIGS. 11A to 11C, for example, based on the binary optics 21 for each of the three wavelengths (BO-A, BO-B, and BO-1 in FIGS. 11A to 11C), their common bonding lens 2 is designed so that design of the bonding lens 2 for the three wavelengths can be performed.

For example, a case will be described in which "CODE V (registered trademark)" is used as known optical design software in the design step S7.

First, as a premise, in the case where "CODE V (registered trademark)" is used, continuous phase distribution can be provided on an optical surface to which the diffractive optical element 101 is applied, regardless of the manufacturing method. The phase distribution is expressed as $\Phi=f(r)$ for rotational symmetry, and is divided by a reference wavelength $\lambda 0$ called a normalized wavelength HWL to be converted into fringe distribution.

The normalized wavelength HWL specifies a wavelength at which optimum efficiency can be obtained, and for the binary optics 21, it is used to calculate the depth of steps. In the phase distribution $\Phi$ for the binary optics 21, it is not expressed stepwise unlike the shape of the binary optics 21, but an analog continuous quantity is expressed using phase coefficients HCO (Cj). For example, ten (Cj: C1 to C10) phase coefficients HCO (Cj) can be input to express the shape of the phase.

For example, in the setting step S2, a phase as an analog quantity can be calculated using "CODE V (registered trademark)", and the first step pattern can be determined from the calculation result. For example, when an eight-step shape called three steps is produced as the first step pattern, lithography exposure and etching are performed three times. The ideal value of the relative ratio of the etching amount is 1:2:4, and the rise of each step can be constant. Note that, in the calculation using "CODE V (registered trademark)", this becomes possible by setting "type (DIF)" to step, and the shape of the first step pattern is determined from the above-described normalized wavelength HWL and phase coefficients HCO (Cj). The rise of each step can be constant as in the case of manufacturing. The above-mentioned "type (DIF)" includes items such as "linear diffraction grating", "phase polynomial (kinoform/binary)", and "holographic optical element".

Based on the above, in the design step S7, the normalized wavelength HWL can be calculated using the above Equation (3). In this case, with $\alpha$ set to 1, when the largest phase in the second phase pattern is associated with Nd and the smallest phase is associated with d, the wavelength $\lambda$ obtained on the right side in the above Equation (3) can be used as the normalized wavelength HWL.

In addition, the phase coefficients HCO (Cj) can be set based on, for example, the values of the phases included in the fine pattern identified in the first identification step S4. In "CODE V (registered trademark)", the set values are calculated as a phase of a continuous quantity. On the other hand, each of the values of the phases included in the fine pattern indicates a discrete value. Therefore, for example, a continuous (analog) value can be obtained by unwrapping the discrete values of the phases for the normalized wavelength HWL, and this process is fitted for each phase coefficient HCO (Cj) so that the set values of the phase coefficients HCO (Cj) can be optimized. Note that the set values can early converge to the optimized values by using the phase coefficients HCO (Cj) set in the setting step S2 as the initial values for fitting of the phase coefficients HCO (Cj).

For example, the method as described above makes it possible to design the bonding lens 2 by using the normalized wavelength HWL and the phase coefficients HCO (Cj) of the binary optics 21 for the second wavelength in conjunction with those for the first wavelength. Note that the reason why the normalized wavelength HWL is not necessarily the second wavelength or the like is that the diffraction efficiency of the metalens 1 having the fine pattern at the second wavelength or the like is reduced. Therefore, if the normalized wavelength HWL is set to the second wavelength or the like, unnecessary light, flare, and ghosts may be caused, resulting in a decrease in optical performance. Therefore, it is preferable to set the normalized wavelength HWL to a value close to the second wavelength or the like, which can be achieved by identifying a fine pattern of a meta-atom for the first wavelength.

For example, after the design step S7, an evaluation step may be performed. In the evaluation step, it is determined whether or not the designed configuration satisfies the specifications determined in the preparation step S0 or the like, and if the specifications are satisfied, the process ends, and if the specifications are not satisfied, the first restrictive condition step S11 is performed again. Note that, in the evaluation step, for example, if the specifications are not satisfied, any one of the second restrictive condition step S12 to the design step S7 may be performed again.

According to the optical design method of the modification, in the setting step S2, the first step pattern of the binary optics 21 is set. Further, in the first identification step S4, the first phase pattern is calculated from the first step pattern, and the fine pattern indicating the shape of the meta-atom corresponding to the first phase pattern is identified with reference to the first phase data. Therefore, by using the first step pattern that can be set by a conventional method, the fine pattern necessary for designing the metalens 1 can be identified. This makes it possible to facilitate optical design of a configuration including the metalens 1.

According to the optical design method of the modification, the setting step S2 includes setting the first step pattern based on optical design of a configuration in which the binary optics 21 and the conventional lens 22 for initial setting are combined. Further, in the first identification step S4, the first phase pattern is calculated from the first step pattern, and the fine pattern indicating the shape of the meta-atom corresponding to the first phase pattern is identified with reference to the first phase data. Therefore, by using the first step pattern based on the combination of the binary optics 21 and the conventional lens 22, the fine pattern necessary for designing the metalens 1 can be identified. This makes it possible to facilitate optical design of a configuration in which the metalens 1 and the bonding lens 2 are combined.

According to the modification, for example, the following can be achieved. First, the design time for the metalens 1 alone can be shortened. If only the metalens 1 is used for an imaging system, it would be necessary to optimize the optical performance of the metalens 1 alone to within the specifications, which would require a plurality of calculations using a vector model optical simulation that takes several hours under one condition. On the other hand, according to the modification, the optical performance of the metalens 1 simply need to be designed within the specifications together with the bonding lens 2. This eliminates the need for the calculations using a vector model optical simulation for optimization such as converging the optical performance of the metalens 1 a plurality of times. Therefore, it is possible to achieve the object by optimizing only the bonding lens 2.

(Second Modification: Optical Design Method)

Next, a second modification of an optical design method according to an embodiment will be described. The difference between the embodiment described above and the second modification is that a second step pattern is identified in the design step S7. Note that descriptions of the same contents as in the embodiments described above will not be repeated.

In the design step S7, a step pattern corresponding to the identified phase pattern can be identified using, for example, Equation (3) described in the first identification step S4. For example, in the design step S7, a step rise d derived for each phase included in the second phase pattern can be identified as the second step pattern of BO-B, and a step rise d derived for each phase included in the third phase pattern can be identified as a third step pattern of BO-1. Thus, in the design step S7, it is also possible to identify different step patterns of the binary optics 21 for each specific wavelength.

In the design step S7, the bonding lens 2 is designed based on the identified one or more step patterns (e.g., the second step pattern). In this designing, known optical design software such as "CODE V (registered trademark)" mentioned above can be used. This makes it possible to design the bonding lens 2 for a plurality of wavelengths.

Also in the modification, in the setting step S2, a first step pattern of the binary optics 21 is set, as in the embodiment described above. Further, in the first identification step S4, a first phase pattern is calculated from the first step pattern, and the fine pattern indicating the shape of the meta-atom corresponding to the first phase pattern is identified with reference to the first phase data. Therefore, by using the first step pattern that can be set by a conventional method, the fine pattern necessary for designing the metalens 1 can be identified. This makes it possible to facilitate optical design of a configuration including the metalens 1.

Note that, in conventional binary optics, a step-shaped pattern with steps of the N-th power of 2 is formed by performing exposure and etching N (a natural number) times. With N=2, 4, or 6, the step-shaped pattern has 4, 8, or 16 steps, respectively.

Possible binary optics 21 for the metalens 1 according to the present proposal may have not only conventional steps of the N-th power of 2 but also 7 or 10 steps. The reason for this is that if the metalens 1 falls under the category of metasurfaces, the shape of the meta-atom only needs to have an effective refractive index that generates the same amount of a phase as the phase that forms a step shape by one exposure and etching.

(Third Modification: Optical Design Method)

Figure 12:
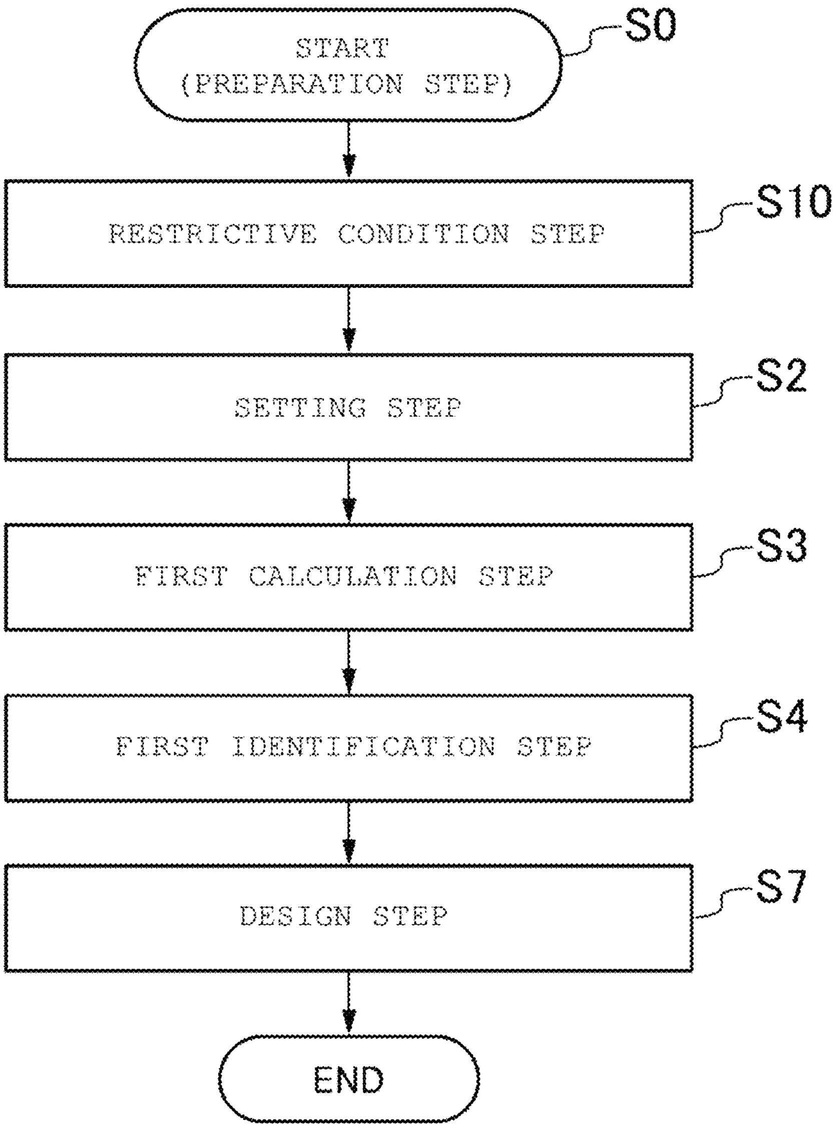
FIG. 12 is a flowchart illustrating a third modification of an optical design method according to an embodiment.

Next, a third modification of an optical design method according to an embodiment will be described. FIG. 12 is a flowchart for the third modification of the optical design method.

The difference between the embodiments described above and the third modification is that the second calculation step S5 and the second identification step S6 are not performed. Note that descriptions of the same contents as in the embodiments described above will not be repeated.

The optical design method according to the modification may include, for example, the first restrictive condition step S11, the second restrictive condition step S12, the setting step S2, the first calculation step S3, and the first identification step S4, and may also include, for example, the design step S7, as illustrated in FIG. 12.

In the setting step S2, a first step pattern may be set based on, for example, optical design of a configuration including only the binary optics 21 in addition to optical design of a configuration in which the binary optics 21 and the conventional lens 22 are combined. In other words, in the setting step S2 according to the modification, it is optional whether or not to use the conventional lens 22.

Also in the modification, in the setting step S2, the first step pattern of the binary optics 21 is set, as in the embodiments described above. Further, in the first identification step S4, a first phase pattern is calculated from the first step pattern, and the fine pattern indicating the shape of the meta-atom corresponding to the first phase pattern is identified with reference to the first phase data. Therefore, by using the first step pattern that can be set by a conventional method, the fine pattern necessary for designing the metalens 1 can be identified. This makes it possible to facilitate optical design of a configuration including the metalens 1.

Note that, in the embodiments described above, three different wavelengths have been exemplified, as illustrated in FIG. 10, for example, but the first wavelength is not necessarily shorter than the second wavelength or longer than the third wavelength (i.e., is not necessarily the central wavelength of the three wavelengths). For example, the following cases may be given. In a case where the lengths of three wavelengths λ21, λ22, and λ23 have a relation of λ21>λ22>λ23 and there is a function of switching and using the illumination wavelength, when the illumination wavelength conditions are:

1. Wavelengths λ21+λ22+λ23 (broad); and
2. Only wavelength 223 (e.g., using a laser) and specifications are set with optimized imaging performance and diffraction efficiency for only the wavelength 223, it is obvious that the object of the present invention is achieved by designing the wavelength 223 as the first wavelength and applying the present proposal for the wavelengths 221 and 222.

(Fourth Modification: Optical Design Method)

Next, a fourth modification of an optical design method according to an embodiment will be described. In the fourth modification, it is possible to deal with problems that occur during "test plate fitting".

First, to manufacture the bonding lens 2 described above, a gauge called a "Newton gauge" is used as a reference to determine the accuracy of the radius of curvature of a lens. The radius of curvature of polishing plates for polishing lenses and Newton gauges for inspection consists of discrete values. For this reason, the final stage of design involves a design process called "test plate fitting".

In fact, for the bonding lens 2 including a plurality of glass materials (lenses), each lens surface can be set as a variable for "test plate fitting", allowing design freedom, while for the bonding lens 2 including only one glass material, there is no design freedom, which may cause problems depending on the use of the optical element 100.

For example, if a radius of curvature of a design value before "test plate fitting" is an intermediate value between those of two test plates, such a lens has problems in the focusing performance such as paraxial focal length and axial chromatic aberration when the radius of curvature of either test plate is out of the specifications.

In the above case, for example, the conventional lens 22 is used as a variable when redesigning in the design step S7 in FIG. 5, but there is a possibility that such a conventional lens 22 alone cannot solve the above-mentioned problems at "test plate fitting". Of course, this can be solved by manufacturing a new "test plate". However, such a countermeasure may also lead to another problem of an increase in the manufacturing process and total cost. Therefore, as a solution to the problems, for example, the process returns to the setting step S2 after the design step S7, the optical performance in question is intentionally shifted to the outside of the specifications, and then the first calculation step S3 and others (e.g., in the flowchart of FIG. 5) are performed. In this case, not only the conventional lens 22 but also the diffractive optical element 101 are used as variables. The amount of the shift depends on the configuration of the "test plates" and the like and thus cannot be determined unambiguously. Accordingly, in response to this, a so-called "trial and error" process is performed that involves shifting it by a certain amount to examine it and then shifting it further if the problems are still not solved. Therefore, as described above, the degree of freedom in design is increased by arranging the diffractive optical element 101 and the conventional lens 22 in the order of the "conventional lens 22 and then the diffractive optical element 101". This may solve the problems at "test plate fitting". Of course, since the distance between the diffractive optical element 101 and the conventional lens 22 becomes more sensitive to various optical performances, there is a possibility that it will be necessary to set the parts and assembly precision to be high.

(Derivation of Expression (1))

An example of deriving Expression (1) will be described below. In an example of the optical design method for the above-described "optical element 100 including the metalens 1 and the bonding lens 2", Expression (1), which represents a relation of "thicknesses+no space between the lenses", is used in the first restrictive condition step S11. Expression (1) is newly proposed by the inventor(s), and the use of Expression (1) makes it possible to efficiently design the optical element 100, for example.

Therefore, prior to the description of the introduction of Expression (1), related techniques will be described below for better understanding.

First, with reference to FIG. 13 and subsequent figures, phase distribution for ray tracing will be described in which the diffractive optical element 101 using "CODE V (registered trademark)" is modeled by an equivalent refractive-index method. Regardless of how it is manufactured, the diffractive optical element 101 expressed using "CODE V (registered trademark)" exhibits continuous phase distribution for each (lens) surface.

In "CODE V (registered trademark)", for a diffractive optical element 101 having a rotationally symmetric shape with respect to an optical axis called HCT R, the phase distribution Φ is expressed by the following Equation (4):

$$\Phi = \sum_{n=1}^{10} C_n r^{2n} \tag{4}$$

The symbols in Equation (4) are defined as follows:

n is a natural number, and r is a radius of curvature.

In "CODE V (registered trademark)", in addition to the definition of wavelengths for designing an optical system, a variable called "normalized wavelength" is set to be used for the diffractive optical element 101, and a diffractive optical element 101 for this wavelength can be targeted (with an optical path length of 2π for the wavelength on physical optics).

Figures 13, 14:
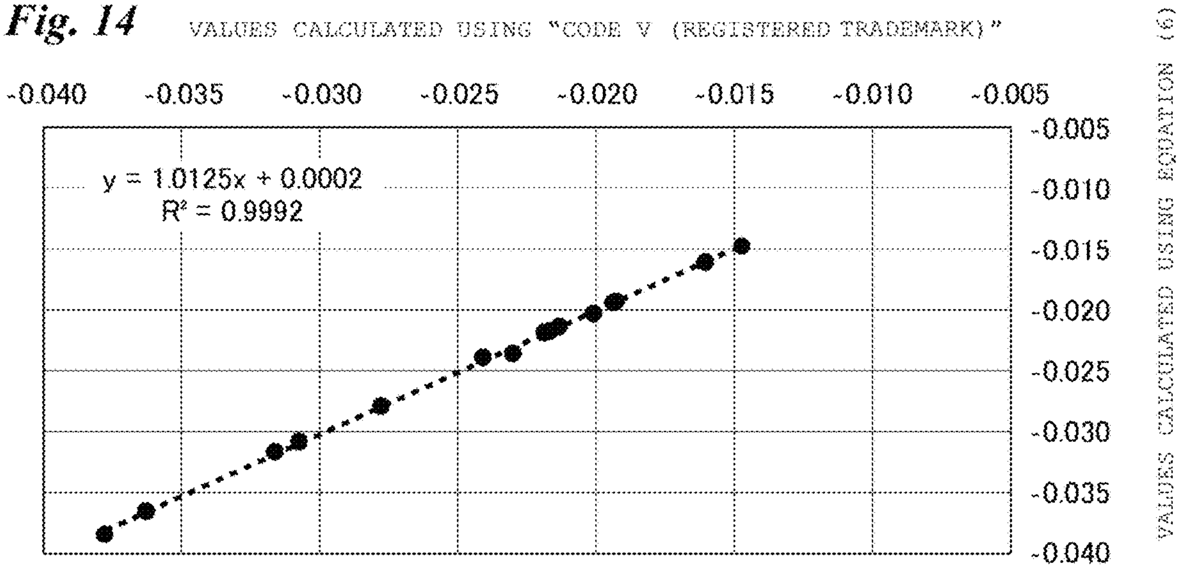
FIG. 13 is a schematic diagram illustrating an example of an input state of a normalized wavelength and phase coefficients of a polynomial for phase distribution.
FIG. 14 is a graph illustrating results of verifying focal length calculation results.

For example, FIG. 13 is a schematic diagram illustrating an example of an input state of the normalized wavelength and phase coefficients Cn of a polynomial for the phase distribution as parameters used in "CODE V (registered trademark)". In the settings illustrated in FIG. 13, diffracted light is traced as first order, the normalized wavelength is set to 500 nm, the value of a phase coefficient C1 is set to −0.005, and the values of the other phase coefficients C2 to C10 are set to 0.

In "CODE V (registered trademark)", the relationship between a focal length EFL of a single surface on which the diffractive optical element 101 is set and the phase coefficient C1 is expressed by the following Equation (5):

$$C1 = -0.5/EFL \tag{5}$$

The relationship between a focal length $EFL_i$ for a specific wavelength $\lambda_i$ on the single surface of the diffractive optical element 101 and the phase coefficient C1 is not available in "CODE V (registered trademark)." Therefore, the inventor (s) have estimated that the above relationship is expressed by the following Equation (6):

$$C1 = -0.5 \times \lambda_0 (EFL_i \times \lambda_i) \tag{6}$$

The symbol in Equation (6) is defined as follows:

$\lambda_0$ is the normalized wavelength.

The above Equation (6) is based on, for example, the following Equation (7), which represents the focal length of a hologram lens, in "T. Stones and N. George: "Hybrid diffractive-refractive lens and achromats," Appl. Opt., 27 (1998) 2960-2971":

$$f(\lambda) = \left(\frac{\lambda_0}{\lambda}\right) f_0 \tag{7}$$

The inventor(s) have actually defined the diffractive optical element 101 under a plurality of conditions in "CODE V (registered trademark)", calculated its focal length EFL, and confirmed the validity of the above Equation (6) (see FIG. 14).

A method for expressing an optical system using a thin lens will now be described. This method can follow, for example, the contents described in "Introduction to Lens Design" (Kyoritsu Shuppan) written by Yoshiya Matsui (particularly on page 28).

For example, by expressing a conventional single lens (with radii of curvature r1 and r2, a glass thickness D, and a refractive index N) as a "thin lens" using paraxial optical theory, the power φ and the reciprocal of the focal length EFL of the single lens can be expressed by the following Equation (8):

$$\varphi = \varphi_1 + \varphi_2 - e'\varphi_1\varphi_2 \tag{8}$$

By using the above Equation (8), even a system of a plurality of lenses can be expressed by a single thin lens with a thickness of "zero".

Hereinafter, the derivation of Expression (1) in the first restrictive condition step 11 will be described.

First, the embodiments relate to a metalens 1, and unlike typical diffractive optical elements, the metalens 1 needs to be handled in consideration of nonlinearity. However, considering it in the category of paraxial optical theory herein, that is, only linearity, which also applies to the diffractive optical element 101, the derivation of Expression (1) will be described for the metalens 1 to be expressed as the diffractive optical element 101. In addition, hereinafter, the bonding lens 2 will be described to be expressed as a conventional lens.

Figure 15:
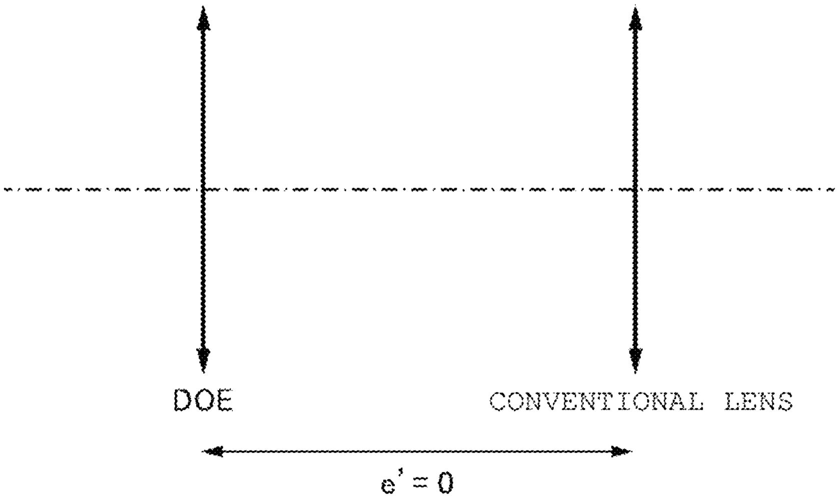
FIG. 15 is a schematic diagram illustrating an example of the positional relationship between a diffractive optical element and a conventional lens.

In the embodiments, it is assumed that the optical characteristics are obtained in which the optical system is in good focus for at least two wavelengths (e.g., the first correction target wavelength and the second correction target wavelength). Accordingly, assuming that Expression (1) is applied for the two wavelengths $\lambda_1$ and $\lambda_2$, a configuration is illustrated in FIG. 15 in which the diffractive optical element 101 (DOE in FIG. 15) and the conventional lens are thin lenses. In addition, the distance e' between the two thin lenses is set to "zero". Note that if the distance e' is strictly set to "zero", it will be difficult to understand the positional relationship between the lenses on the drawing, so that in FIG. 15, each lens is illustrated at positions apart from each other but with "distance e'=0".

By substituting a power $\varphi_d$ of the diffractive optical element 101 and a power $\varphi_c$ of the conventional lens into Equation (8), the following Equation (9) representing the power φ of the entire system is obtained (however, the distance e' is set to "zero"):

$$\varphi = \varphi_d + \varphi_c \tag{9}$$

When the powers φ of the entire systems for the two wavelengths $\lambda_1$ and $\lambda_2$ are p1 and p2, respectively, the absence of axial chromatic aberration for the two wavelengths $\lambda_1$ and $\lambda_2$ is indicated by the following Equation (10) (i.e., the powers $\varphi_1$ and $\varphi_2$ of the entire system are equal):

$$\varphi_1 = \varphi_2 \tag{10}$$

When wavelength information of the above Equation (9) is added to the above Equation (10), the following Equation (11) is obtained:

$$\varphi_{d1} + \varphi_{c1} = \varphi_{d2} + \varphi_{c2} \tag{11}$$

The following Equation (12) is obtained by rearranging the above Equation (11). The left side of the following Equation (12) indicates the power related to the diffractive optical element 101, and the right side indicates the power related to the conventional lens.

$$\varphi_{d1} - \varphi_{d2} = -\varphi_{c1} + \varphi_{c2} \tag{12}$$

Furthermore, taking into consideration that the powers $\varphi_{d1}$ and $\varphi_{d2}$ on the left side of the above Equation (12) are reciprocals of the focal length EFL, the following Equations (13) and (14) are obtained using Equation (6):

$$\varphi_{d1} = 1/EFL_1 = -2\times\lambda_1/(C_1\times\lambda_0) \tag{13}$$

$$\varphi_{d2} = 1/EFL_2 = -2\times\lambda_2/(C_1\times\lambda_0) \tag{14}$$

Also, based on the following Equations (15) to (17) described on page 19 of "Introduction to Lens Design" (Kyoritsu Shuppan) written by Yoshiya Matsui, the right side of the above Equation (12) can be expressed as Equation (18):

$$\varphi_1 = (N-1)/r1 \tag{15}$$

$$\varphi_2 = (1-N)/r2 \tag{16}$$

$$e' = d/N \tag{17}$$

$$-\varphi_{c1} + \varphi_{c2} = -(1-N1)/rc + (1-N2)/rc = (N1-N2)/rc \tag{18}$$

The symbols in Equations (15) to (18) are defined as follows:

N is a refractive index of the glass material, N1 is a refractive index of the glass material for the wavelength $\lambda_1$ (e.g., the first refractive index), N2 is a refractive index of the glass material for the wavelength $\lambda_2$ (e.g., the second refractive index), r1 and r2 are radii of curvature of the glass material, and rc is a radius of curvature of the conventional lens.

In light of the above, by substituting the above Equations (13), (14), and (18) into the above Equation (12) and rearranging the resulting equation, Equation (101) mentioned above is obtained. Considering the units and coefficients that differ depending on the software, the above Expression (1) indicating a proportional relationship can be derived from the above Equation (101) indicating an equal relationship. As a result, Expression (1) in the first restrictive condition step S11 is derived.

Note that Expression (1) is, but not limited to, for the configuration of FIG. 15 in which the diffractive optical element 101 and the conventional lens are arranged in this order from the left. For example, Expression (1) may be for a configuration in which they are arranged in the reverse order from the left, that is, the conventional lens and the diffractive optical element 101.

For example, although it is considered unrealistic to set the distance e' to "zero", one of the advantages of applying a metalens to ToF or the like described as the previous example is that a thin optical system can be achieved. For this reason, it is preferable to set the distance e' to a small value as much as possible, and thus it is believed that even if the distance e' is set to "zero", a large error will not occur.

Of course, in reality, the distance e' is not to be "zero", not resulting in a thin lens. Therefore, it is necessary to "thicken" the lens, and this process corresponds to the second restrictive condition step S12 illustrated in FIG. 4 and others. In this case, the configuration in which the conventional lens and the diffractive optical element 101 are arranged in this order from the left has a higher degree of freedom in design than the reverse configuration in which the diffractive optical element 101 and the conventional lens are arranged in this order from the left. For an object at infinity, the incident light enters in parallel. Therefore, for a configuration in which the diffractive optical element 101 and the conventional lens are combined, light with a height h of 1 enters the first surface in paraxial tracing, that is, the surface of the diffractive optical element 101. The diffractive optical element 101 has an equivalent Abbe number of −3.452 for the d, C, and F lines, which is a small negative absolute value (=large dispersion), resulting in having higher chromatic aberration than conventional lenses. Accordingly, in order to correct the chromatic aberration in the entire system, the burden of correction on the conventional lens side becomes large.

On the other hand, in the reverse configuration in which the conventional lens and the diffractive optical element 101 are arranged in this order form the left, the height h at the surface of the diffractive optical element 101 changes from a value of 1 depending on the distance, in fact, the thickness of the glass material and the value of the refractive index. In other words, the degree of freedom in design increases.

However, having a high degree of design freedom means being sensitive to errors, and if the glass thickness and refractive index values deviate from the design values, the optical performance will deteriorate. These advantages and disadvantages need to be taken into consideration when selecting a configuration.

Cases have been described above in which commercially available optical design software called "CODE V (registered trademark)" is used. However, the present invention is not limited to being applied to only "CODE V (registered trademark)", and can be applied to all optical design software that models the diffractive optical element 101 using the equivalent refractive-index method. Of course, among optical design software applications, the definition for the variables to be set by the user is different, so that they will not have equal values.

In a case where Ansys ZEMAX OPTICSTUDIO (registered trademark) is used as another optical design software, when A1 is the polynomial coefficient variable expressing the phase distribution corresponding to C1 in the above Expression (1) and others, the inventor(s) have found that the relationship between C1 and A1 is given by the following Equations (19) and (20) (when the variable called normalization radius in Ansys ZEMAX OPTICSTUDIO (registered trademark) is set to 1):

$$C1 = A1 \times (\lambda/2\pi)/1000 \tag{19}$$

$$\lambda_0 = \lambda_1 \tag{20}$$

Note that the units of input variables in each optical design software application are different, for example, the unit of wavelength is nm or μm, but in the relational expression between A1 and C1, the input values are used as they are.

In this way, it is obvious that the present invention can be applied by determining, for the relational expression proposed in the present invention, the relation between the variables defined to be used in other optical design software applications and the variables in "CODE V (registered trademark)", deforming the relational expression using that relation, and using the resulting relational expression. Note that the above Expressions (1) and (2) can be used regardless of whether "CODE V (registered trademark)" or Ansys ZEMAX OPTICSTUDIO (registered trademark) is used.

Although several embodiments of the present invention have been described, these embodiments are presented by way of example and are not intended to limit the scope of the invention. These novel embodiments can be implemented in various other forms, and various omissions, substitutions, and omissions, replacement, and changes can be made without departing from the scope and spirit of the invention. These embodiments and their modifications are included within the scope and the spirit of the invention, as well as within the scope of the invention described in the claims and its equivalents.

REFERENCE SIGNS LIST

1 Metalens
2 Bonding lens
2*a* First glass material
2*b* Second glass material
3 Diaphragm
4 Parallel light
5 Condensed light
11 Finely shaped surface
12 Bonded surface
21 Binary optics
22 Conventional lens
100 Optical element
101 Diffractive optical element
S0 Preparation step
S10 Restrictive condition step
S11 First restrictive condition step
S12 Second restrictive condition step
S2 Setting step
S3 First calculation step
S4 First identification step
S5 Second calculation step
S6 Second identification step S7 Design step
d Step rise
e' Distance
h Height

What is claimed is:

1. An optical element comprising:

a metalens having a finely shaped surface on which a fine pattern is formed based on a shape of a meta-atom and a bonded surface formed in a flat shape; and a bonding lens having a feature equivalent to an existing lens and being bonded to the bonded surface, wherein the bonding lens includes:

a first glass material bonded to the bonded surface; and a second glass material separated from the bonded surface and bonded to the first glass material.

2. An optical design method for designing an optical element comprising a metalens having a finely shaped surface on which a fine pattern is formed based on a shape of a meta-atom and a bonded surface formed in a flat shape, and a bonding lens having a feature equivalent to an existing lens and being bonded to the bonded surface, the method comprising:

a first restrictive condition step of identifying conditions for a diffractive optical element and the bonding lens that satisfy:

$$B1 \propto \lambda_0(N1 - N2)/(R \times (\lambda_1 - \lambda_2)),$$

wherein:

B1 is a phase coefficient used to model the diffractive optical element by an equivalent refraction method using optical design software;

$\lambda_0$ is a normalized wavelength of the diffractive optical element;

$\lambda_1$ is a first correction target wavelength to be subjected to axial chromatic aberration correction;

$\lambda_2$ is a second correction target wavelength to be subjected to axial chromatic aberration correction;

N1 is a first refractive index of the bonding lens for the first correction target wavelength;

N2 is a second refractive index of the bonding lens for the second correction target wavelength; and R is a radius of curvature of a convex surface of the bonding lens.

3. The optical design method according to claim 2, further comprising:

a setting step of setting, based on optical design of a configuration including binary optics included in one diffractive optical element replacing a feature of the metalens, a first step pattern of the binary optics;

a first calculation step of calculating first phase data indicating a phase relationship with respect to the shape of the meta-atom based on a preset first wavelength; and a first identification step of calculating a first phase pattern from the first step pattern and identifying the fine pattern corresponding to the first phase pattern with reference to the first phase data.

4. The optical design method according to claim 3, wherein the setting step includes setting the first step pattern based on optical design of a configuration in which the binary optics and a conventional lens for initial setting are combined.

5. The optical design method according to claim 4, further comprising:

a second calculation step of calculating second phase data different from the first phase data based on a preset second wavelength different from the preset first wavelength;

a second identification step of identifying a second phase pattern corresponding to the fine pattern with reference to the second phase data; and a design step of designing the bonding lens based on the first phase pattern and the second phase pattern.

6. The optical design method according to claim 5, wherein the design step includes identifying a second step pattern corresponding to the second phase pattern, and designing the bonding lens based on the second step pattern.

7. The optical design method according to claim 3, wherein the first calculation step includes calculating the first phase data using a vector model optical simulation.

8. An optical design method for designing an optical element comprising a metalens having a finely shaped surface on which a fine pattern is formed based on a shape of a meta-atom and a bonded surface formed in a flat shape, and a bonding lens having a feature equivalent to an existing lens and being bonded to the bonded surface, the method comprising:

a second restrictive condition step of identifying conditions for a diffractive optical element and the bonding lens that satisfy:

$$B1 \propto \lambda_0(\varphi_{pc2} - \varphi_{pc1})/(-\lambda_1(1 - e'\varphi_{pc1}) + \lambda_2(1 - e'\varphi_{pc2})),$$

wherein:

B1 is a phase coefficient used to model the diffractive optical element by an equivalent refraction method using optical design software;

$\lambda_0$ is a normalized wavelength of the diffractive optical element;

$\lambda_1$ is a first correction target wavelength to be subjected to axial chromatic aberration correction;

$\lambda_2$ is a second correction target wavelength to be subjected to axial chromatic aberration correction;

$\varphi_{pc1}$ is a reciprocal of focal length of the bonding lens;

$\varphi_{pc2}$ is a reciprocal of focal length of the diffractive optical element; and e' is a geometric optical distance between the diffractive optical element and the bonding lens.

* * * * *